Feb. 21, 1967  R. BEHN  3,305,418
METHOD AND APPARATUS FOR USE IN THE FABRICATION
OF ELECTRICAL CAPACITORS
Filed April 23, 1963
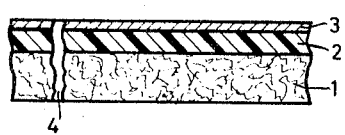
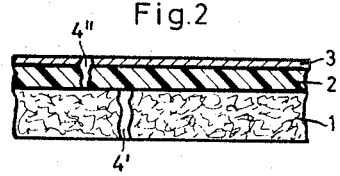
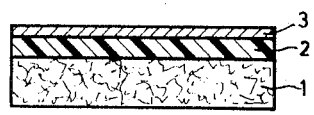
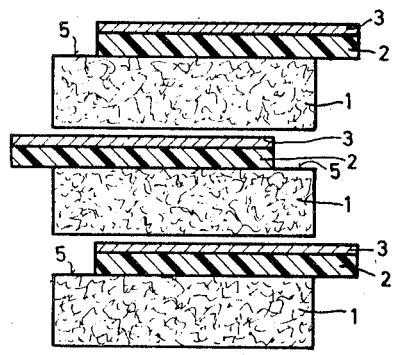
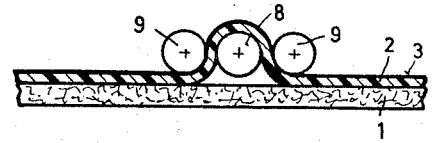
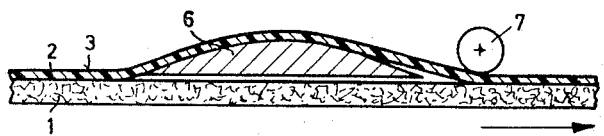
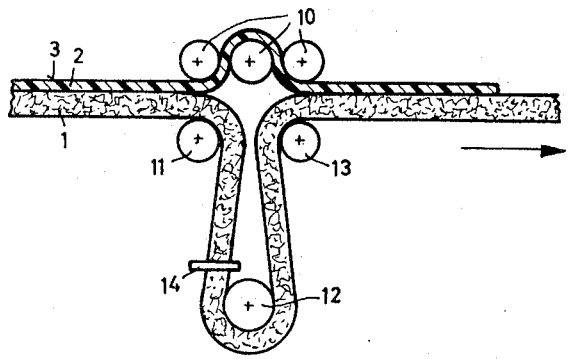

United States Patent Office 3,305,418
Patented Feb. 21, 1967

3,305,418
METHOD AND APPARATUS FOR USE IN THE FABRICATION OF ELECTRICAL CAPACITORS
Reinhard Behn, Munich, Germany, assignor to Siemens & Halske Aktiengesellschaft Berlin and Munich, a German corporation
Filed Apr. 23, 1963, Ser. No. 275,481
Claims priority, application Germany, Apr. 25, 1962, 79,158
10 Claims. (Cl. 156—152)

The invention disclosed herein is concerned with a method of and device for making electrical capacitors with great breakdown strength, having a dielectric which comprises bands of paper or synthetic material and varnish layers and having coatings consisting of metal layers provided upon the varnish layer.

As is known, the breakdown strength of the dielectric of an electrical capacitor can be increased by a plural layer construction, that is, an increase of the breakdown strength is obtained with identical total thickness of the dielectric, upon using for the dielectric instead of a relatively thick band, a plurality of thinner bands. This is due to the fact that dielectric bands, especially paper bands, always contain pores and parts with decreased breakdown strength, which pass as a rule only through one of a plurality of assembled thin bands, so that a pore or the like, contained in a given band, does not appear in alignment with a pore or the like in another band lying on either side thereof, whereby contiguous pores or weak points are avoided.

It is also, known, in the production of regenerative capacitors, to provide a varnish layer upon the dielectric band on which a metal coating is to be vaporized, prior to the vaporization of the coating, so as to even out irregularities on the surface of the dielectric band. However, while pores and weak points contained in individual dielectric foils are mutually covered up upon assembling such foils one on the other, such effect cannot be obtained by the provision of a varnish layer. According to experience, contiguous pores passing through paper and the entire varnish layer, occur even when providing two varnish layers.

In order to avoid the above indicated drawbacks of the two-layer dielectric while retaining the advantages thereof, it is in accordance with the invention proposed to provide upon the paper band or band made of synthetic material, a varnish layer which is easily separable therefrom, to thereupon vaporize on the varnish layer a metal coating, to thereafter shift the position of the varnish layer on the respective band, and to use the band thus prepared for producing capacitors. The shifting of the varnish layer with respect to the dielectric band subdivides contiguous pores and mutually displaces the resulting partial pores. The provision of one varnish layer is sufficient since the mutual shifting between the varnish layer and the dielectric results necessarily in a two-layer dielectric with an increased breakdown strength.

The shifting between the varnish layer and the supporting band is advantageously effected after the varnished band is cut to form strips according to the width of the capacitors to be produced. It is of particular advantage to effect the shifting at least in part in a direction transverse to the longitudinal direction of the respective band or strip. This makes it possible to vaporize on the uncut band a metal coating covering the entire surface thereof instead of vaporizing thereon, as is now customery, strips of metal coating separated by unmetallized strips. After cutting the metallized band, there are obtained bands or strips which are metallized throughout without leaving marginal unmetallized (insulating) strips. The marginal insulating strip which is required for the construction of capacitors, is formed by shifting or displacing the varnish layer on the dielectric band in a direction extending transverse to the longitudinal direction thereof.

Further details and features of the invention will appear from the description which is rendered below with reference to the accompanying drawing showing the respective arrangements on greatly enlarged scales, in cross-sectional views, with identical parts similarly referenced.

FIG. 1 shows the presence of a continuous pore in a processed band;

FIG. 2 indicates the interruption of the pore by mutual shifting of parts;

FIG. 3 represents a band cut to the width of a capacitor to be produced;

FIG. 4 illustrates the formation of a marginal insulating strip on the band of FIG. 4, by the shifting of parts;

FIG. 5 shows a plurality of bands according to FIG. 4, as arranged in a capacitor; and FIGS. 6 to 8 represent possibilities for effecting the mutual shifting or displacement of parts.

In FIG. 1, numeral 1 indicates the dielectric band, that is, the paper band or band made of synthetic material, numeral 2 the varnish layer provided thereon, and numeral 3 the metal coating vaporized on the varnish layer 3. Pores in parts 1–3 form in the arrrangement a continuous pore 4 which reduces the breakdown strength of the dielectric.

In FIG. 2, the varnish layer 2 (with the metal coating 3) has been laterally shifted with respect to the dielectric band 1, as intended by the invention. The pore (4 in FIG. 1) has been interrupted and the resulting partial pores 4′ and 4″ are mutually displaced.

FIG. 3 shows a strip cut from the processed band to the width of the capacitor to be produced, and FIG. 4 shows the same strip with the varnish layer 2 (and metal coating 3 thereon) shifted transverse to the longitudinal direction of the strip, thereby forming the marginal insulating strip 5, thus making possible a full surface metallization 3 as shown in FIG. 3.

A plurality of capacitor bands or strips such as shown in FIG. 4, are arranged as indicated in FIG. 5, to form a capacitor. The danger of penetration of metal particles has been prevented owing to the slight thickness of the varnish layer 2 as compared with the length of displacement thereof relative to the dielectric band 1.

As indicated before, FIGS. 6 to 8 show possibilities for effecting the shifting of the varnish layer with respect to the dielectric band made of paper or of synthetic material.

In case the dielectric band had been metallized so as to leave vacant a marginal insulating strip, it will merely be necessary to shift the varnish film in longitudinal direction of the respective band. This may be done, for example, as illustrated in FIG. 6, by successively lifting the varnish layer 2 (with its metal coating 3) from the dielectric 1, by means of a wedge-shaped slide 6 and guiding it back to the dielectric band 1. A shifting of the varnish layer longitudinally of the band 1 is effected since the path of motion of the varnish layer is longer than that of the dielectric. A pressure roller 7 may be used for pressing the displaced or shifted varnish layer in engagement with the dielectric. As shown in FIG. 7, deflection rollers 8 and guide- and pressure rollers 9 may be used in place of the wedge-shaped slide 6.

A device such as schematically shown in FIG. 8 may be used in case the shifting between the varnish layer and the dielectric band is to be effected solely in a direction transverse to the longitudinal direction of the band or longitudinally as well as transversely. The varnish layer 2 is thereby guided over the rollers 10 while the dielectric band 1 is guided over the rollers 11, 12 and 13. The dielectric band 1 may also move in self-supporting manner along longer stretches. Numeral 14 indicates a member which engages an edge of the dielectric 1 for the purpose of shifting it laterally. The same effect may be obtained by arranging the axis of the roller 12 at a slight incline with respect to the axes of the rollers 11 and 13. The band 1 is in this manner shifted in a direction transverse to the longitudinal direction thereof. In addition thereto, there is obtained a shifting in the longitudinal direction due to the different length of the displacement paths of the varnish layer 2 and the dielectric band 1.

The shifting of the varnish layer with respect to the dielectric band can be effected incident to the winding of a capacitor or incident to the cutting of the primary band to obtain the strips or bands with a width corresponding to the capacitors to be produced. It is thus, for example, possible to arrange devices according to FIGS. 6 and 7 in combination with a band cutting machine or a capacitor winding machine, and to arrange a device according to FIG. 8 in combination with a capacitor winding machine.

Changes may be made within the scope and spirit of the appended claims which define what is believed to be new and desired to have protected by Letters Patent.

I claim:

1. A method for use in the manufacture of electrical capacitors with great breakdown strength, having a dielectric in the form of a self-supporting band with a varnish layer provided thereon and a metal coating provided upon the varnish layer, comprising the steps of providing upon the dielectric band a varnish layer which can be easily separated therefrom, with the varnish layer being superimposed thereon in a first surface registration, vaporizing on the varnish layer a metal layer, separating said varnish layer from said band, effecting a shift transversely to the separating direction in the surface relation of the varnish layer with respect to the supporting dielectric band to produce a second different surface registration therebetween, and uniting the varnish layer in its shifted relation to said dielectric band to form a unitary structure for subsequent use in the fabrication of a capacitor.

2. A method according to claim 1, comprising the step of cutting said band to obtain strips with a width corresponding to the width of capacitors to be produced, and effecting said shifting on the respective strips.

3. A method according to claim 2, wherein said shifting is effected in a direction longitudinally of the respective strips.

4. A method according to claim 2, wherein said shifting is effected in a direction transverse to the longitudinal direction of the respective strips.

5. A method according to claim 1, wherein the metal is vaporized on said varnish layer in the form of an uninterrupted layer.

6. A method according to claim 5, comprising the step of cutting said band to obtain strips with a width corresponding to the width of capacitors to be produced, and effecting said shifting on the respective strips.

7. A method according to claim 6, wherein said shift in the surface relation of the varnish layer with respect to the dielectric strip is effected by moving the separated varnish layer and the dielectric strip over paths of different length, and thereafter effecting the uniting said varnish layer with said strip.

8. A device for use in the fabrication of wrapped capacitors formed by an assembly of a dielectric strip having a varnish layer provided thereon and having a metal coating vaporized on said varnish layer, comprising means for moving said assembly, means for separating said varnish layer with said metal coating from said dielectric strip during such movement and forming respective paths from said strip and separated varnish layer, which paths are of different effective lengths, whereby the surface of said varnish layer is shifted with respect to the surface of said dielectric strip in a direction transverse to the separating direction, and means for bringing said varnish layer into engagement with said dielectric strip to reassemble the same into a unitary assembly for subsequent use in the fabrication of a capacitor.

9. A device according to claim 8, wherein said separating and path forming means comprises deflection rollers for separately guiding said strip and said varnish layer to effect the motion thereof for said separation, and means for shifting said strip relative to the varnish layer in a direction transverse to the longitudinal motion thereof.

10. A device according to claim 9, wherein said transverse shifting means comprises a deflection roller for said strip, the axis of which extends at an angle to the longitudinal direction thereof.

References Cited by the Examiner

UNITED STATES PATENTS

| 2,195,860 | 4/1940 | George et al. | 161—64 |
| 2,800,946 | 7/1957 | Steffen | 156—152 |
| 2,975,094 | 3/1961 | Anderson | 156—152 X |

EARL M. BERGERT, *Primary Examiner.*

M. L. KATZ, *Assistant Examiner.*